US012343902B1

(12) United States Patent
Li et al.

(10) Patent No.: US 12,343,902 B1
(45) Date of Patent: Jul. 1, 2025

(54) MULTI-PUMP LINKAGE GROUTING OPERATING SYSTEM

(71) Applicants: SHANDONG UNIVERSITY, Shandong (CN); SHAANXI XITAN GEOLOGICAL EQUIPMENT CO., LTD, Shaanxi (CN)

(72) Inventors: Mengtian Li, Jinan (CN); Shuaixun Luo, Xi'an (CN); Shucai Li, Jinan (CN); Zhaohui Dong, Xi'an (CN); Jianbo Zhao, Xi'an (CN); Zhaofeng Li, Jinan (CN); Lei Yang, Jinan (CN); Zhenhao Xu, Jinan (CN); Hanpeng Wang, Jinan (CN); Chunjin Lin, Jinan (CN)

(73) Assignees: SHANDONG UNIVERSITY, Jinan (CN); SHAANXI XITAN GEOLOGICAL EQUIPMENT, Xi'an (CN)

( * ) Notice: Subject to any disclaimer, the term of this patent is extended or adjusted under 35 U.S.C. 154(b) by 0 days.

(21) Appl. No.: 18/947,601

(22) Filed: Nov. 14, 2024

(30) Foreign Application Priority Data

Mar. 21, 2024 (CN) ........................ 202410327741.4

(51) Int. Cl.
*B28C 7/16* (2006.01)
*B28C 7/04* (2006.01)
*B28C 9/04* (2006.01)

(52) U.S. Cl.
CPC ........... *B28C 7/163* (2013.01); *B28C 7/0486* (2013.01); *B28C 9/0454* (2013.01)

(58) Field of Classification Search
CPC ..... B28C 7/163; B28C 7/0486; B28C 9/0454; B28C 7/0481; B28C 7/162; B28C 7/16;
(Continued)

(56) References Cited

U.S. PATENT DOCUMENTS 3,807,706 A * 4/1974 Kugle .................. F04B 7/0225 366/27
4,039,170 A * 8/1977 Cornwell ................ A62C 5/00 366/29
(Continued)

FOREIGN PATENT DOCUMENTS

CN 209277877 U 8/2019
CN 210948703 U 7/2020
(Continued)

*Primary Examiner* — Craig M Schneider
*Assistant Examiner* — Andrew J Rost
(74) *Attorney, Agent, or Firm* — Oliff PLC

(57) ABSTRACT

The present invention provides a multi-pump linkage grouting operating system, including a slurry storage unit including a plurality of slurry storage tanks and a grouting unit including a plurality of grouting pumps; wherein, an inlet of each grouting pump is connected to main slurry inlet pipe, the main slurry inlet pipe is connected to a plurality of branch slurry inlet pipes connected to an outlet of corresponding slurry storage tank; grouting on-off valves are mounted on the branch slurry inlet pipes, each branch slurry inlet pipe is further connected to one end of a cleaning pipe, a connection position between the cleaning pipe and the branch slurry inlet pipe is located downstream of the grouting on-off valve on the branch slurry inlet pipe, the other end of the cleaning pipe is connected to a water tank, and a cleaning on-off valve is mounted on the cleaning pipe.

10 Claims, 8 Drawing Sheets

(58) Field of Classification Search
CPC ......... B28C 9/004; B28C 9/04; B28C 9/0463; F17C 2205/0161
USPC .......................................................... 137/267
See application file for complete search history.

(56) References Cited

U.S. PATENT DOCUMENTS

| | | | | |
|---|---|---|---|---|
| 4,178,117 | A * | 12/1979 | Brugler | B28C 7/0486 414/268 |
| 4,494,903 | A * | 1/1985 | Badicel | B65D 88/32 414/574 |
| 5,730,523 | A * | 3/1998 | Flood | B28C 7/0445 366/18 |
| 6,007,233 | A * | 12/1999 | Cairns | B01F 27/114 366/50 |
| 6,234,408 | B1 * | 5/2001 | Stevens | B28C 9/004 239/304 |
| 2002/0001255 | A1 * | 1/2002 | Flood | B28C 9/004 366/50 |
| 2017/0021529 | A1 * | 1/2017 | Cunningham | B28C 7/044 |

FOREIGN PATENT DOCUMENTS

| | | | |
|---|---|---|---|
| CN | 111720128 | A | 9/2020 |
| CN | 214886975 | U | 11/2021 |
| CN | 217872796 | U | 11/2022 |
| CN | 116357384 | A | 6/2023 |
| CN | 116696400 | A | 9/2023 |
| CN | 117162264 | A | 12/2023 |
| TW | 399114 | B | 7/2000 |

* cited by examiner

MULTI-PUMP LINKAGE GROUTING OPERATING SYSTEM

TECHNICAL FIELD

The present invention relates to the technical field of geotechnical engineering construction devices, and in particular, to a multi-pump linkage grouting operating system.

BACKGROUND

The statements herein merely provide the background related to the present invention and do not necessarily constitute the related technology.

Grouting is a main technical means for dealing with damages such as sudden water and mud in a construction process of underground engineering, and the patent application with application no. 202210589955.X discloses a mining grouting operating system and process, including a mobile turnover silo, a quantitative material feeding system, a quantitative water feeding system, a slurry storage mixer, and a grouting pump. A screw conveyor is disposed at a bottom portion of a mobile turnover system, and the screw conveyor is connected to a hoist. A gravity sensor and a screw conveyor controller are disposed in the quantitative material feeding system. The gravity sensor can monitor a quantity of materials in a mixer in real time, and the screw conveyor controller can send an instruction to the screw conveyor according to the quantity of materials. A water pump and a water pump controller are disposed in the quantitative water feeding system, and a required amount of water can be added to a grouting mixer according to the quantity of materials. A slurry transfer device is arranged between the mixer and the slurry storage mixer. The slurry transfer device includes a density meter and a density controller to monitor the density of slurry in real time. It has been found by the inventors that the grouting operating system above has the defects:

1. The grouting operating system can only be applied to single-pipe single-liquid grouting operations, and cannot be applied to other grouting processes such as multi-pipe multi-liquid grouting;
2. The device cannot be cleaned automatically, and the device needs to be cleaned manually when faults such as pipe blockage occur; and
3. The device is low in automation and intelligence, and cannot adjust an output flow and pressure in real time according to data such as slurry pressure in the formation.

SUMMARY

In view of the shortcomings of the related technology, an objective of the present invention is to provide a multi-pump linkage grouting operating system and an operating method thereof, which can implement a plurality of grouting processes, and by which a device can be cleaned automatically without manual cleaning of the device.

To achieve the objective above, the present invention is implemented through the following technical solutions:

an embodiment of the present invention provides a multi-pump linkage grouting operating system, including a slurry storage unit and a grouting unit, where the slurry storage unit includes a plurality of slurry storage tanks, the grouting unit includes a plurality of grouting pumps, an inlet of each grouting pump is connected to a main slurry inlet pipe, the main slurry inlet pipe is connected to a plurality of branch slurry inlet pipes, the branch slurry inlet pipes are connected to an outlet of a corresponding slurry storage tank, grouting on-off valves are mounted on the branch slurry inlet pipes, each branch slurry inlet pipe is further connected to one end of a cleaning pipe, a connection position between the cleaning pipe and the branch slurry inlet pipe is located downstream of the grouting on-off valve on the branch slurry inlet pipe, the other end of the cleaning pipe is connected to a water tank, and a cleaning on-off valve is mounted on the cleaning pipe.

Optionally, a flow detection element is further mounted on the branch slurry inlet pipe to detect a grouting flow, the flow detection element is connected to a control system, and correspondingly the grouting pump is connected to the control system through an inverter.

Optionally, a stirring apparatus is mounted in the slurry storage tank, to stir a slurry inside the slurry storage tank.

Optionally, the system further includes a plurality of mixing plants, where an inlet of each slurry storage tank is connected to a corresponding mixing plant through a slurry conveying pipeline, and a slurry storage tank slurry inlet on-off valve is mounted on the slurry conveying pipeline.

Optionally, the system further includes a main water storage tank, where the mixing plants are connected to the main water storage tank through mixing plant cleaning pipelines, mixing plant cleaning on-off valves are mounted on the mixing plant cleaning pipelines, the main water storage tank is connected to the slurry storage tanks through slurry storage tank cleaning pipelines, slurry storage tank cleaning on-off valves are mounted on the slurry storage tank cleaning pipelines, a clean water tank is connected to the main water storage tank through a water replenishing pipeline, and a water replenishing on-off valve is disposed on the water replenishing pipeline.

Optionally, the slurry storage tanks and the water tank are mounted on a first traveling vehicle, the first traveling vehicle is provided with a traction frame, the first traveling vehicle is connected to a second traveling vehicle through the traction frame and a tow hook disposed on the second traveling vehicle, and the plurality of grouting pumps are mounted on the second traveling vehicle.

Optionally, the first traveling vehicle includes a first vehicle body, a traveling wheel is mounted at a bottom portion of the first vehicle body, the second traveling vehicle includes a second vehicle body, a crawler type traveling mechanism is mounted at a bottom portion of the second vehicle body, and the crawler type traveling mechanism is connected to a power mechanism mounted on the second vehicle body.

Optionally, each of the first traveling vehicle and the second traveling vehicle is provided with a protection cover, the protection cover of the first traveling vehicle is provided with a door, a cover wall of the protection cover of the second traveling vehicle parallel to a traveling direction is provided with an opening, an upper protection plate and a lower protection plate are disposed at the opening, an upper edge of the upper protection plate is rotatably connected to the cover wall of the protection cover, and a lower edge of the lower protection plate is rotatably connected to the cover wall of the protection cover.

Optionally, a rear end of the first traveling vehicle is provided with a first support mechanism, front and rear ends of the second traveling vehicle are each provided with at least one second support mechanism, the first support mechanism is rotatably connected to the first traveling vehicle, the second support mechanism includes a telescopic component having an axis that is arranged vertically, and a bottom end of the telescopic component is connected to a support plate.

In a second aspect, an embodiment of the present invention provides an operating method for a multi-pump linkage grouting operating system, including:

turning on a grouting on-off valve on a branch slurry inlet pipe between a grouting pump needing to operate and a slurry storage tank containing a cement slurry and turning off a cleaning on-off valve, to enable the grouting pump to implement single-liquid grouting;

turning on a grouting on-off valve on a branch slurry inlet pipe between a slurry storage tank containing a first slurry and a corresponding grouting pump for outputting the first slurry, turning on a grouting on-off valve on a branch slurry inlet pipe between a slurry storage tank containing a second slurry and a corresponding grouting pump for outputting the second slurry, turning off the other grouting on-off valves, and turning off cleaning on-off valves, to implement double-liquid grouting through the grouting pumps; and turning on the cleaning on-off valves, to enable the grouting pumps corresponding to the cleaning on-off valve to operate, so that under the function of the grouting pumps, water in a water tank successively flows through the corresponding cleaning pipes, the branch slurry inlet pipes, the main slurry inlet pipes, and the grouting pumps to implement cleaning of the branch slurry inlet pipes, the main slurry inlet pipes, and grouting pump pipelines.

The present invention has the following beneficial effects:

1. In the multi-pump linkage grouting operating system of the present invention, the clean water tank is provided, the clean water tank is connected to the branch slurry inlet pipes through the cleaning pipes, and the cleaning on-off valves are disposed on the cleaning pipes, so that after the cleaning on-off valves are turned on and the grouting pumps are started, the grouting pumps can drive the water in the clean water tank to successively flow through the cleaning pipes, the branch slurry inlet pipes, and the grouting pumps, thereby implementing automatic cleaning of the branch slurry inlet pipes and the main slurry inlet pipes without manual cleaning, greatly improving the operation efficiency of the cleaning operation, and reducing the labor intensity.

2. In the multi-pump linkage grouting operating system of the present invention, the main water storage tank is provided, the main water storage tank is connected to the slurry storage tanks through the slurry storage tank cleaning pipelines, and the slurry storage tank cleaning on-off valves are mounted on the slurry storage tank cleaning pipelines, so that after the slurry storage tank cleaning on-off valves are turned on and the grouting pumps are started, the water in the main water storage tank can successively flow through the slurry storage tanks and the grouting pumps, thereby implementing cleaning of the slurry storage tanks without manual cleaning, greatly improving the operation efficiency of the cleaning operation, and reducing the labor intensity.

3. In the multi-pump linkage grouting operating system of the present invention, the plurality of grouting pumps are provided, each grouting pump is connected to a plurality of slurry storage tanks through the main slurry inlet pipes and the branch slurry inlet pipes, and the grouting on-off valves are disposed on the branch slurry inlet pipes, so that each branch slurry inlet pipe can operate independently; and through coordinated operations of the grouting on-off valves and the corresponding grouting pumps, grouting by one grouting pump or grouting by a combination of grouting pumps is implemented, so that a plurality of grouting processes such as single-pipe grouting and multi-pipe grouting are implemented, and the applicability is strong.

4. In the multi-pump linkage grouting operating system of the present invention, the flow detection elements are mounted on the branch slurry inlet pipes, and the grouting pumps are connected to the control system through the inverters, so that the inverters can adjust the operation frequencies of the grouting pumps according to flow information detected by the flow detection elements, thereby implementing adjustment of the grouting flow and meeting the requirements of the slurry flow and pressure in the formation.

BRIEF DESCRIPTION OF THE DRAWINGS

The accompanying drawings, which constitute a part of the present invention, are used to provide further understanding of the present invention. The exemplary embodiments of the present invention and the description thereof are used to explain the present invention, and do not constitute improper limitations to the present invention.

45, inverter; 46, second protection cover; 47, upper protection plate; 48, lower protection plate; 49, second support mechanism; 50, first mixing plant; 51, second mixing plant; 52, first slurry conveying pipeline; 53, first slurry storage tank slurry inlet on-off valve; 54, second slurry conveying pipeline; 55, second slurry storage tank slurry inlet on-off valve; 56, main water storage tank; 57, first mixing plant cleaning pipeline; 58, first mixing plant cleaning on-off valve; 59, second mixing plant cleaning pipeline; 60, second mixing plant cleaning on-off valve; 61, first slurry storage tank cleaning pipeline; 62, first slurry storage tank cleaning on-off valve; 63, second slurry storage tank cleaning pipeline; 64, second slurry storage tank cleaning on-off valve; 65, water replenishing on-off valve; 66, first pump body; 67, second pump body; 68, third pump body.

DETAILED DESCRIPTION

For the convenience of description, the words "upper" and "lower" appear in the present invention only indicate consistence with upper and lower directions of the accompanying drawings, and do not limit the structure, and the words are only for the convenience of describing the present invention and simplifying the description, and do not indicate or imply that the device or components referred to need to have a specific orientation, or be constructed and operated in a specific orientation, and therefore cannot be understood as a limitation to the present invention.

Embodiment 1

Figure 1:
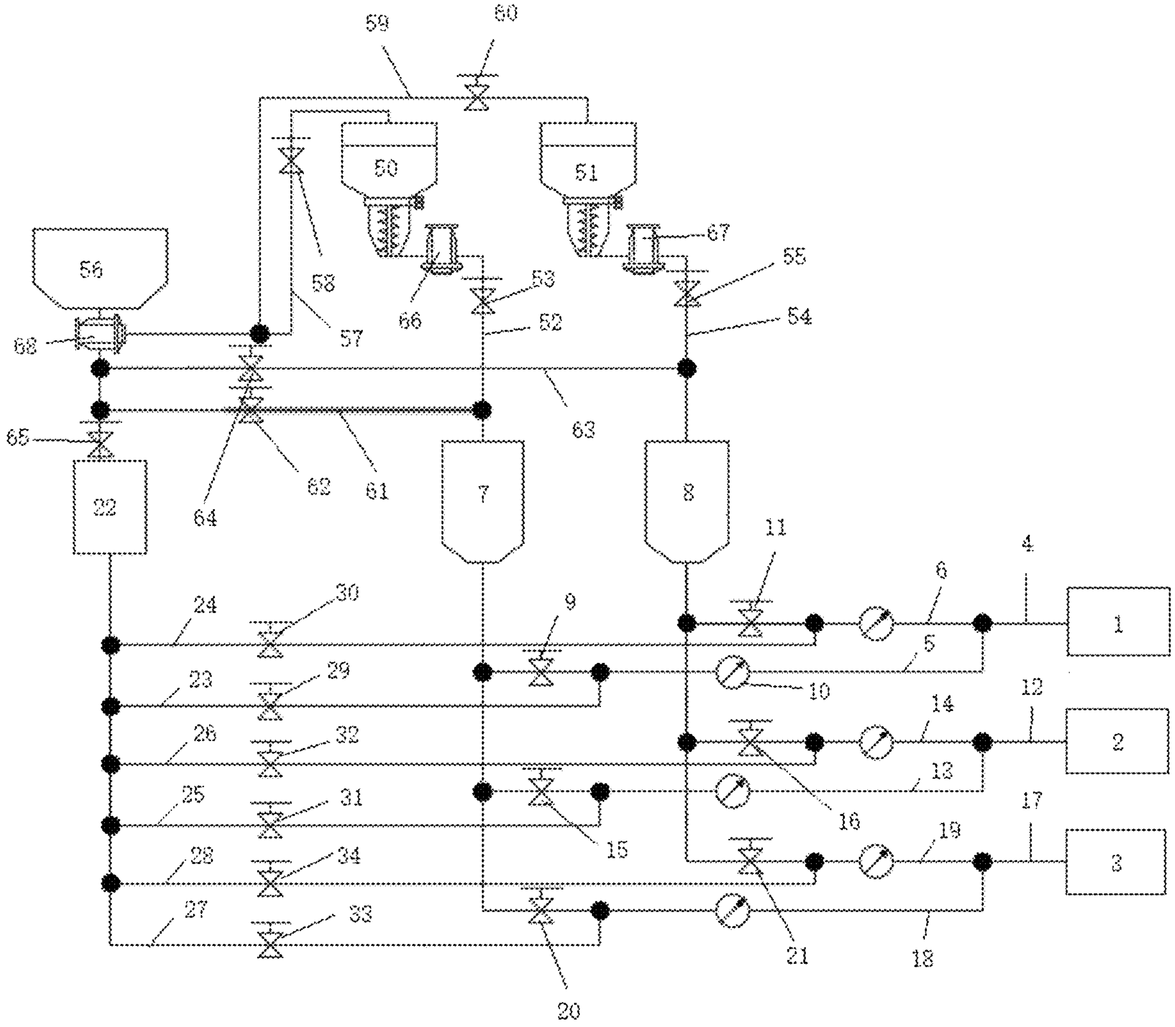
FIG. 1 is an overall principle diagram of Embodiment 1 of the present invention.
Figure 2:
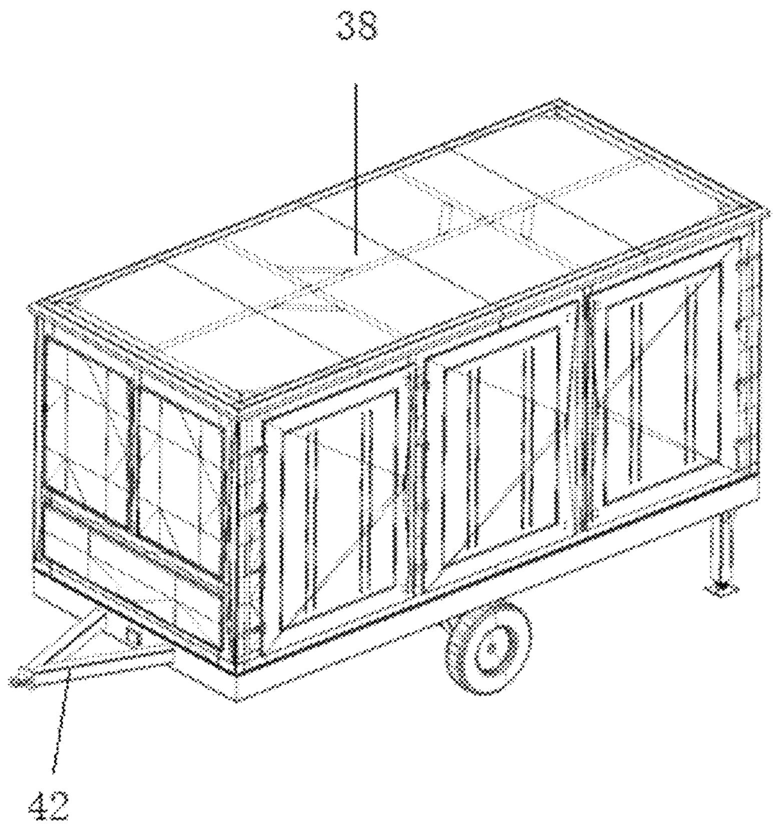
FIG. 2 is a schematic structural diagram of a slurry storage unit according to Embodiment 1 of the present invention.
Figure 3:
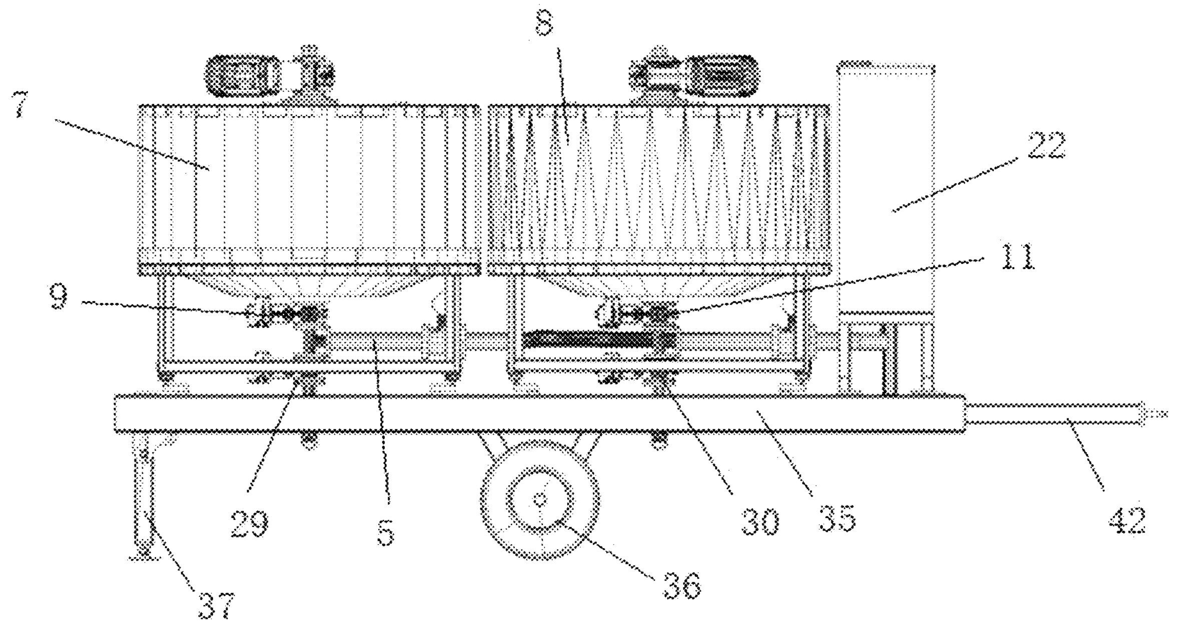
FIG. 3 is a front view of an interior of a first protection cover according to Embodiment 1 of the present invention.
Figure 4:
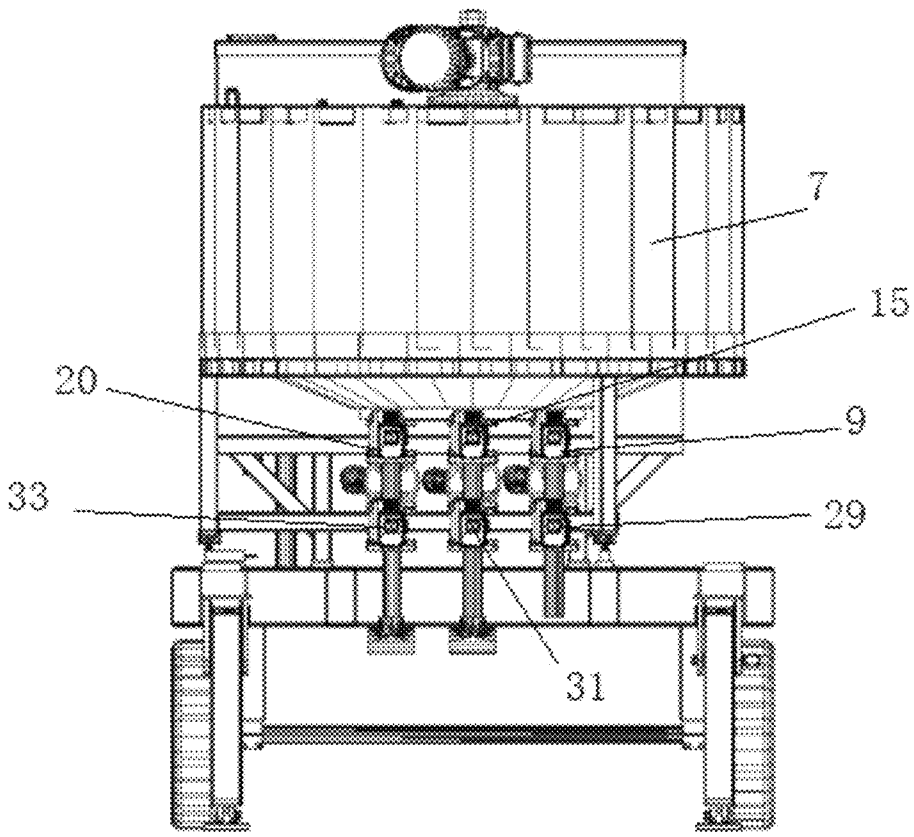
FIG. 4 is a side view of the interior of the first protection cover according to Embodiment 1 of the present invention.
Figure 5:
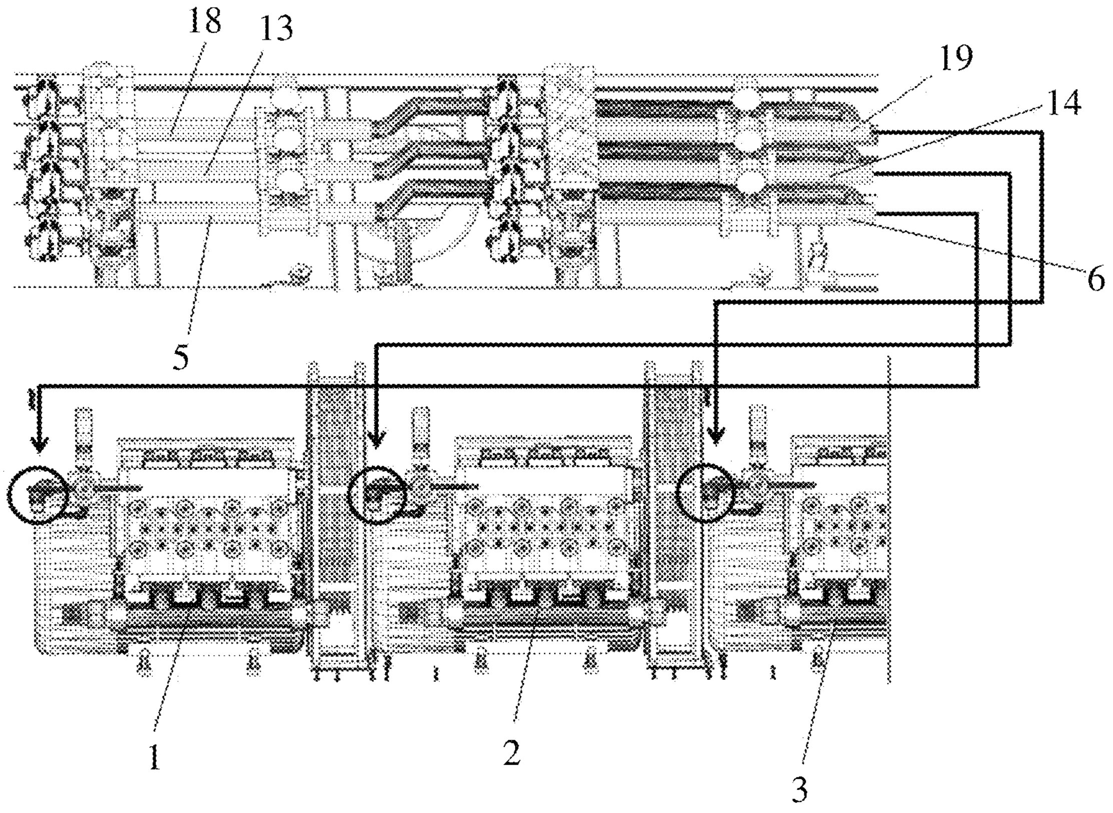
FIG. 5 is a schematic diagram of arrangement of main slurry inlet pipes and branch slurry inlet pipes at a first traveling vehicle according to Embodiment 1 of the present invention.
Figure 6:
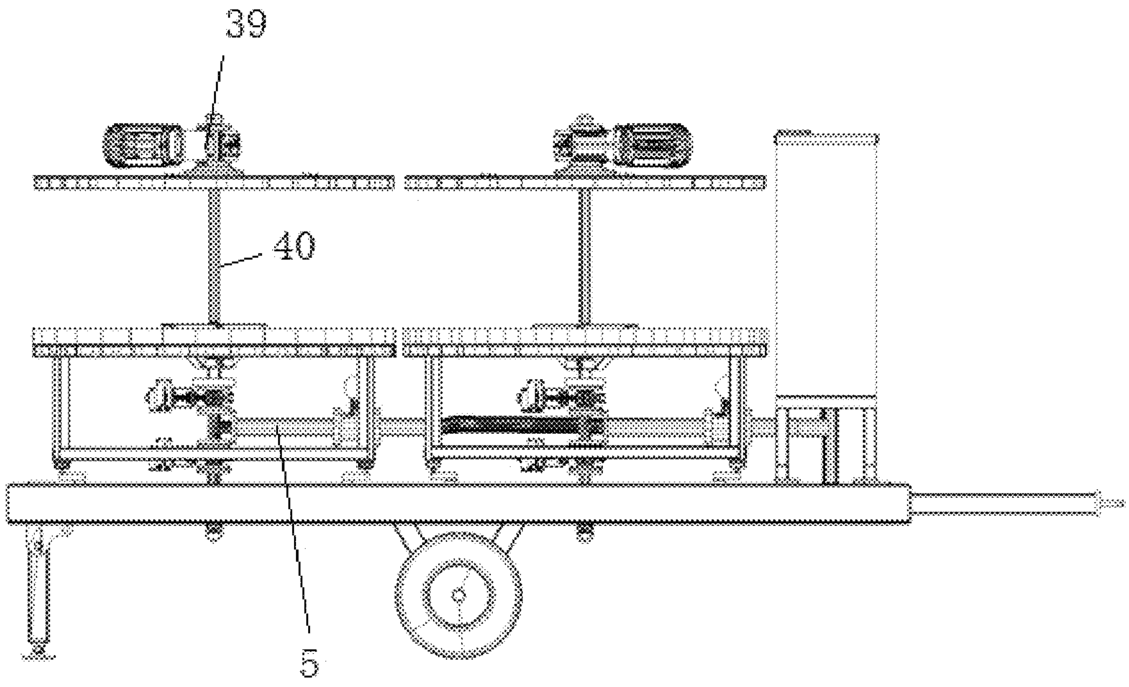
FIG. 6 is a schematic diagram of a stirring mechanism of a slurry storage tank according to Embodiment 1 of the present invention.

The present embodiment provides a multi-pump linkage grouting operating system, as shown in FIG. 1, including a slurry storage unit and a grouting unit. The slurry storage unit is configured to store slurry for grouting and transfer the slurry to the grouting unit. The grouting unit is configured to perform grouting. The slurry storage unit includes a plurality of slurry storage tanks. The grouting unit includes a plurality of grouting pumps. The slurry storage tanks are connected to the grouting pumps through pipelines and valve sets. A separate or combined operation of the grouting pumps can be implemented, and requirements of different grouting process can be met. In addition, a water tank is further provided, and the water tank is connected to a pipeline between the grouting unit and the slurry storage unit through a cleaning pipeline, to clean the pipeline.

In the slurry storage unit, two slurry storage tanks are provided, and in the grouting unit, three grouting pumps are provided. It may be understood that those skilled in the art can set the number of the slurry storage tanks and the grouting pumps according to actual needs, which is not described in detail herein.

In the present embodiment, the three grouting pumps are respectively defined as a first grouting pump 1, a second grouting pump 2, and a third grouting pump 3, and the two slurry storage tanks are respectively defined as a first slurry storage tank 7 and a second slurry storage tank 8.

An inlet of the first grouting pump 1 is connected to a first main slurry inlet pipe 4, a slurry inlet end of the first main slurry inlet pipe 4 is connected to a first branch slurry inlet pipe 5 and a second branch slurry inlet pipe 6 arranged in parallel, the first branch slurry inlet pipe 5 is connected to an outlet of the first slurry storage tank 7, and the second branch slurry inlet pipe 6 is connected to an outlet of the second slurry storage tank 8.

A first grouting on-off valve 9 and a flow detection element are successively arranged on the first branch slurry inlet pipe 4 in a slurry flow direction. Preferably, the flow detection element uses an existing flow detector 10.

A second grouting on-off valve 11 and a flow detection element are successively arranged on the second branch slurry inlet pipe 6 in a slurry flow direction. Preferably, the flow detection element uses an existing flow detector.

Similarly:

an inlet of the second grouting pump 2 is connected to a second main slurry inlet pipe 12, a slurry inlet end of the second main slurry inlet pipe 12 is connected to a third branch slurry inlet pipe 13 and a fourth branch slurry inlet pipe 14 arranged in parallel, the third branch slurry inlet pipe 13 is connected to an outlet of the first slurry storage tank 7, and the fourth branch slurry inlet pipe 14 is connected to an outlet of the second slurry storage tank 8.

A third grouting on-off valve 13 and a flow detection element are successively arranged on the third branch slurry inlet pipe 15 in a slurry flow direction. Preferably, the flow detection element uses an existing flow detector.

A fourth grouting on-off valve 14 and a flow detection element are successively arranged on the fourth branch slurry inlet pipe 16 in a slurry flow direction. Preferably, the flow detection element uses an existing flow detector.

An inlet of the third grouting pump 3 is connected to a third main slurry inlet pipe 17, a slurry inlet end of the third main slurry inlet pipe 17 is connected to a fifth branch slurry inlet pipe 18 and a sixth branch slurry inlet pipe 19 arranged in parallel, the fifth branch slurry inlet pipe 18 is connected to an outlet of the first slurry storage tank 7, and the sixth branch slurry inlet pipe 19 is connected to an outlet of the second slurry storage tank 8.

A fifth grouting on-off valve 18 and a flow detection element are successively arranged on the fifth branch slurry inlet pipe 20 in a slurry flow direction. Preferably, the flow detection element uses an existing flow detector.

A sixth grouting on-off valve 19 and a flow detection element are successively arranged on the sixth branch slurry inlet pipe 21 in a slurry flow direction. Preferably, the flow detection element uses an existing flow detector.

The system includes a water tank 22. The water tank is configured to contain cleaning water. An outlet of the water tank is connected to a main water outlet pipe. The main water outlet pipe is connected to a first cleaning pipe 23, a second cleaning pipe 24, a third cleaning pipe 25, a fourth cleaning pipe 26, a fifth cleaning pipe 27, and a sixth cleaning pipe 28.

One end of the first cleaning pipe 23 is connected to a main water inlet pipe, the other end thereof is connected to the first branch slurry inlet pipe 5, and a connection position with the first branch slurry inlet pipe 5 is located downstream of the first grouting on-off valve 9 and upstream of the flow detector 10. A first cleaning on-off valve 29 is mounted on the first cleaning pipe 23.

One end of the second cleaning pipe 24 is connected to the main water inlet pipe, the other end thereof is connected to the second branch slurry inlet pipe 6, and a connection position with the second branch slurry inlet pipe 6 is located downstream of the second grouting on-off valve 11 and upstream of the flow detector. A second cleaning on-off valve 30 is mounted on the second cleaning pipe 24.

One end of the third cleaning pipe 25 is connected to the main water inlet pipe, the other end thereof is connected to the third branch slurry inlet pipe 13, and a connection position with the third branch slurry inlet pipe 13 is located at downstream of the third grouting on-off valve 15 and upstream of the flow detector. A third cleaning on-off valve 31 is mounted on the third cleaning pipe 25.

One end of the fourth cleaning pipe 26 is connected to the main water inlet pipe, the other end thereof is connected to the fourth branch slurry inlet pipe 14, and a connection position with the fourth branch slurry inlet pipe 14 is located downstream of the fourth grouting on-off valve 16 and upstream of the flow detector. A fourth cleaning on-off valve 32 is mounted on the fourth cleaning pipe 14.

One end of the fifth cleaning pipe 27 is connected to the main water inlet pipe, the other end thereof is connected to the fifth branch slurry inlet pipe 18, and a connection position with the fifth branch slurry inlet pipe 18 is located downstream of the fifth grouting on-off valve 20 and upstream of the flow detector. A fifth cleaning on-off valve 33 is mounted on the fifth cleaning pipe 27.

One end of the sixth cleaning pipe 28 is connected to the main water inlet pipe, the other end thereof is connected to the sixth branch slurry inlet pipe 19, and a connection position with the sixth branch slurry inlet pipe 19 is located downstream of the sixth grouting on-off valve 21 and upstream of the flow detector. A sixth cleaning on-off valve 34 is mounted on the sixth cleaning pipe 28.

In the present embodiment, as shown in FIG. 2 to FIG. 6, bottom portions of the first slurry storage tank 7 and the second slurry storage tank 8 are provided with brackets. The brackets are fixed on a first traveling vehicle, and the first slurry storage tank and the second slurry storage tank are supported by the brackets.

The bottom portion of the first slurry storage tank 7 is provided with a funnel structure. A bottom portion of the funnel structure is provided with three outlets, respectively connected to the first branch slurry inlet pipe 5, the third branch slurry inlet pipe 13, and the fifth branch slurry inlet pipe 18. The first grouting on-off valve 9, the third grouting on-off valve 15, and the fifth grouting on-off valve 20 are respectively mounted at the three outlets at the bottom portion of the first slurry storage tank 7.

The bottom portion of the second slurry storage tank 8 is provided with a funnel structure. A bottom portion of the funnel structure is provided with three outlets, respectively connected to the second branch slurry inlet pipe 6, the fourth branch slurry inlet pipe 14, and the sixth branch slurry inlet pipe 19. The second grouting on-off valve 11, the fourth grouting on-off valve 16, and the sixth grouting on-off valve 21 are respectively mounted at the three outlets at the bottom portion of the second slurry storage tank 8.

The six branch slurry inlet pipes are below the two slurry storage tanks, and are separately converged to three main slurry inlet pipes at one end of the first traveling vehicle. The three main slurry inlet pipes are respectively connected to three grouting pumps.

The other end of the first traveling vehicle is provided with a water tank 22. A bottom end of the water tank 22 is connected to the main water outlet pipe. The first cleaning on-off valve 29 is disposed below the first grouting on-off valve 9, the second cleaning on-off valve 30 is disposed below the second grouting on-off valve 11, the third cleaning on-off valve 31 is disposed below the third grouting on-off valve 15, the fourth cleaning on-off valve 32 is disposed below the fourth grouting on-off valve 16, the fifth cleaning on-off valve 33 is disposed below the fifth grouting on-off valve 20, and the sixth cleaning on-off valve 34 is disposed below the sixth grouting on-off valve 21.

The first traveling vehicle includes a first vehicle body 35. Two slurry storage tanks are mounted on the first vehicle body 35. A set of traveling wheels 36 is mounted in a middle part at the bottom portion of the first vehicle body 35. There are two traveling wheels 36 coaxially arranged. The two traveling wheels are connected by an axle. The axle is rotatably connected to an axle bracket. The axle is fixed on a bottom surface of the first vehicle body. The traveling wheels 36 are arranged by using the related technology, which is not described in detail herein.

A rear end of the bottom portion of the first vehicle body 35 is provided with at least one first support mechanism 37. The first support mechanism adopts a support rod. One end of the support rod is rotatably connected to the first vehicle body 35, and the other end of the support rod is fixed with a support plate. The support plate is configured to contact with a ground foundation and support the first vehicle body 35.

Preferably, the support rod adopts an existing telescopic rod, the related technology can be used, and a specific structure thereof is not described in detail herein.

The first vehicle body 35 is further provided with a first protection cover 38, the slurry storage tanks and the other components are disposed inside the first protection cover 38, and the first protection cover 38 is configured to protect the slurry storage tanks and the other components inside the first protection cover 38.

The first protection cover 38 is provided with a door, for an operator to enter the first protection cover 38 to perform overhaul and maintenance on the internal components such as the slurry storage tanks and the on-off valves.

Each of the two slurry storage tanks is provided with a stirring apparatus. Specifically, the slurry storage tank includes a tank body, a cover is disposed on a top portion of the tank body, a drive motor 39 is disposed at a central part of the cover, an output shaft of the drive motor 39 is connected to a stirring shaft 40 extending into the tank body, the stirring shaft 40 is vertically connected to a plurality of stirring rods, and the stirring rods stir the slurry inside the slurry storage tank.

Figure 7:
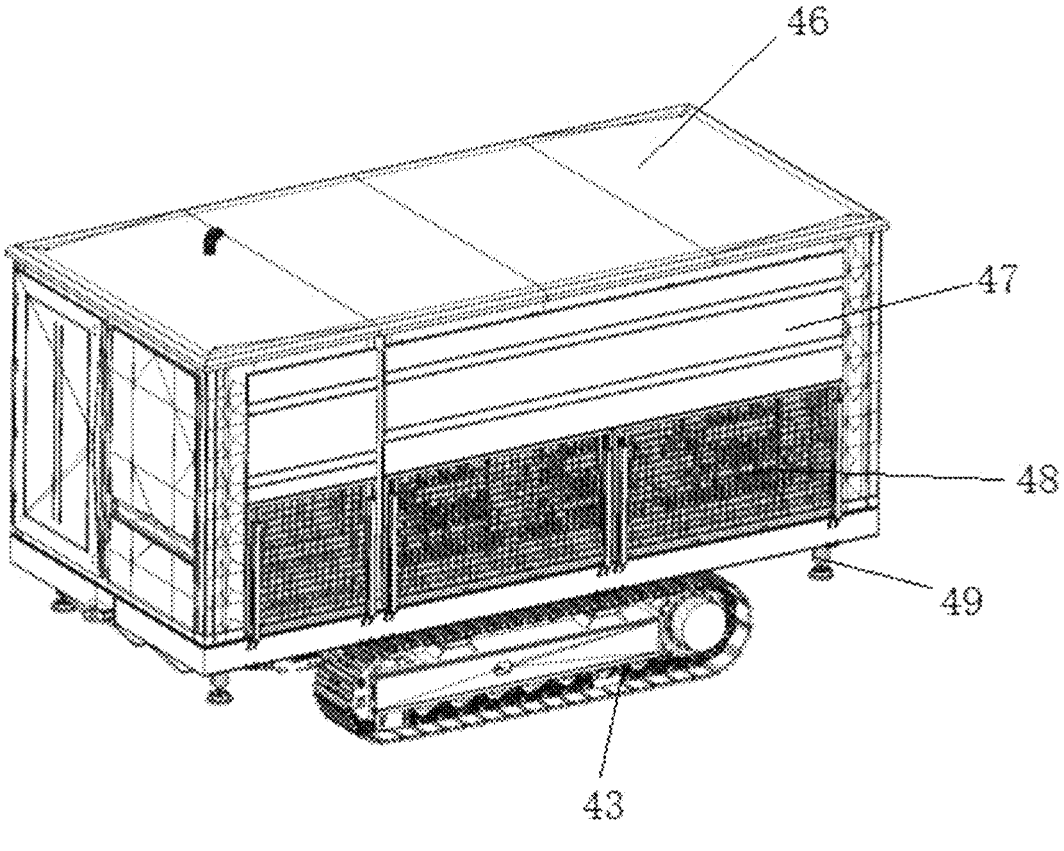
FIG. 7 is a schematic structural diagram of a grouting unit according to Embodiment 1 of the present invention.
Figure 8:
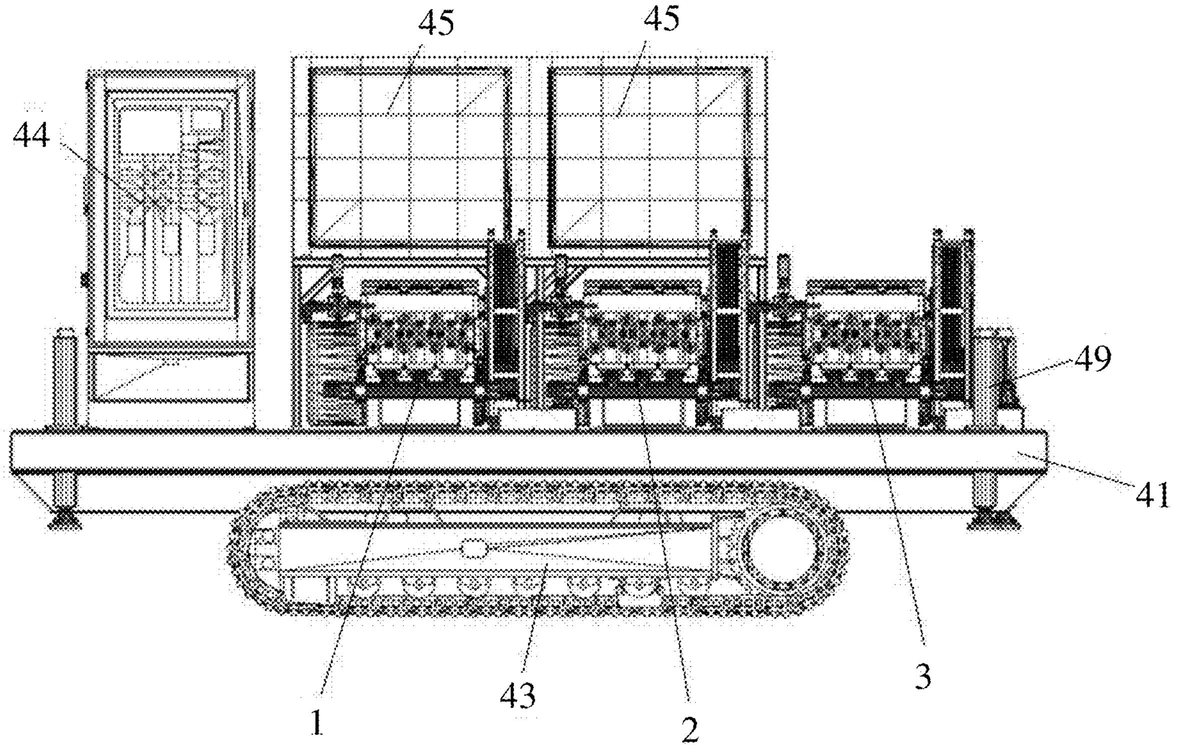
FIG. 8 is a first schematic diagram of an interior of a second protection cover according to Embodiment 1 of the present invention.
Figure 9:
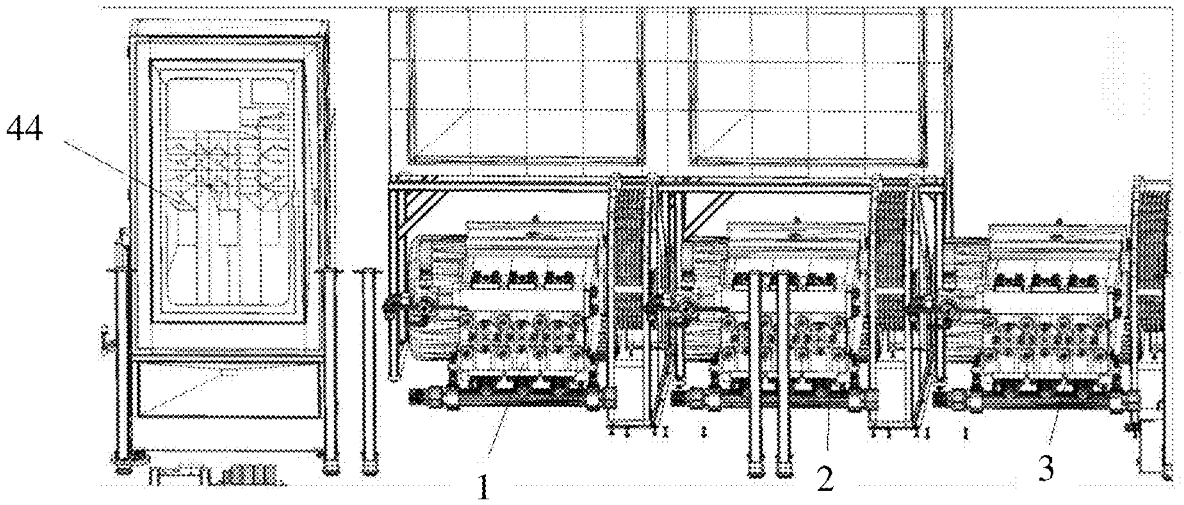
FIG. 9 is a second schematic diagram of the interior of the second protection cover according to Embodiment 1 of the present invention, where, 1, first grouting pump; 2, second grouting pump; 3, third grouting pump; 4, first main slurry inlet pipe; 5, first branch slurry inlet pipe; 6, second branch slurry inlet pipe; 7, first slurry storage tank; 8, second slurry storage tank; 9, first grouting on-off valve; 10, flow detector; 11, second grouting on-off valve; 12, second main slurry inlet pipe; 13, third branch slurry inlet pipe; 14, fourth branch slurry inlet pipe; 15, third grouting on-off valve; 16, fourth grouting on-off valve; 17, third main slurry inlet pipe; 18, fifth branch slurry inlet pipe; 19, sixth branch slurry inlet pipe; 20, fifth grouting on-off valve; 21, sixth grouting on-off valve; 22, water tank; 23, first cleaning pipe; 24, second cleaning pipe; 25, third cleaning pipe; 26, fourth cleaning pipe; 27, fifth cleaning pipe; 28, sixth cleaning pipe; 29, first cleaning on-off valve; 30, second cleaning on-off valve; 31, third cleaning on-off valve; 32, fourth cleaning on-off valve; 33, fifth cleaning on-off valve; 34, sixth cleaning on-off valve; 35, first vehicle body; 36, traveling wheel; 37, first support mechanism; 38, first protection cover; 39, drive motor; 40, stirring shaft; 41, second vehicle body; 42, traction frame; 43, crawler type traveling mechanism; 44, control cabinet.

As shown in FIG. 7 to FIG. 9, three grouting pumps are mounted on a second traveling vehicle, the second traveling vehicle includes a second vehicle body 41, and a rear end of the second vehicle body 41 is provided with a tow hook; correspondingly, a front end of the first vehicle body is provided with a traction frame 42, and the second traveling vehicle is connected to the first traveling vehicle through the tow hook and the traction frame 42.

A traveling mechanism is mounted on a bottom surface of the second vehicle body 41, the traveling mechanism adopts an existing crawler type traveling mechanism 43, and the crawler type traveling mechanism 43 is connected to a power mechanism mounted on the second vehicle body 41; the power mechanism adopts a diesel engine mounted on the second vehicle body 41, and a mode in which the power mechanism is connected to the crawler type traveling mechanism adopts the related technology, which is not described in detail herein.

The second traveling vehicle can travel in a self-propelled manner, to drive the first traveling vehicle to travel through the traction frame 42 and the tow hook.

Three grouting pumps are mounted on the second vehicle body. Inlets of the three grouting pumps are detachably connected to grouting pipelines through flanges and bolts, and the three grouting pipelines are respectively detachably connected to the three main slurry inlet pipes through flanges and bolts.

A control cabinet 44 is further mounted on the second vehicle body, and a control system is disposed in the control cabinet 44. The control system is connected to the grouting pump through inverters 45 disposed on the second vehicle body, and can control, through the inverters, the grouting pumps to operate.

A flow detector is connected to the control system and can transmit detected flow information to the control system. The drive motor and the power mechanism are connected to the control system, and the control system can control the drive motor and the power mechanism to operate.

In the present embodiment, the inverters 45 can adjust operating frequencies of the grouting pumps according to the flow information detected by the flow detector, thereby implementing adjustment of the grouting flow and meeting the requirements of the slurry flow in the formation.

The second vehicle body is provided with a second protection cover 46, and devices such as the grouting pumps, the control cabinet, the power mechanism, and the inverters are located inside the second protection cover 46, to be protected by the second protection cover 46.

A side cover wall of the second protection cover 46 parallel to a traveling direction is provided with an opening, an upper protection plate 47 and a lower protection plate 48 are disposed at the opening, a top edge of the upper protection plate 47 is rotatably connected to the side cover wall, an edge of the bottom portion the lower protection plate 48 is rotatably connected to the side cover wall, and the upper protection plate 47 and the lower protection plate 48 can open the opening, so that the three main slurry inlet pipes are connected to the three grouting pumps through the main grouting pipelines.

A door lock mechanism is arranged between an upper edge of the lower protection plate 48 and a lower edge of the upper protection plate 47, so that the upper protection plate 47 and the lower protection plate 48 can be locked in a folded state. The door lock mechanism may adopt the related technology, and a specific structure thereof is not described in detail herein.

Upper and lower portions of side edges on both sides of the opening are rotatably connected to support rods. One ends of two support rods at the upper portion are rotatably connected to the side cover wall, and the other ends can be inserted into a slot provided on a side edge of the upper protection plate, so as to lock the upper protection plate in an unfolded state.

One ends of two support rods at the lower portion are rotatably connected to the side cover wall, and the other ends are provided with hooks, so that the hooks can be connected to hanging rings at a side edge of the lower protection plate, so as to lock the lower protection plate in an unfolded state.

The lower protection plate can be unfolded in a horizontal state, and can form a traveling step for an operator to enter the second vehicle body.

Further, the lower protection plate 48 adopts a grid plate to facilitate heat dissipation of the internal devices.

Second support mechanisms 49 are mounted at four corners of the bottom surface of the second vehicle body, the second support mechanism 49 includes a telescopic mechanism, the telescopic mechanism adopts a hydraulic cylinder, a cylinder body of the hydraulic cylinder is fixed to the second vehicle body 41, a piston rod of the hydraulic cylinder is connected to a support plate, and the support plate is configured to coordinate with a ground foundation, so as to support the second vehicle body.

The multi-pump linkage grouting operating system further includes two mixing plants, which are respectively a first mixing plant 50 and a second mixing plant 51. The first mixing plant 50 and the second mixing plant 51 adopt existing devices, and specific structures thereof are not described in detail herein.

The first mixing plant 50 is connected to an inlet of the first slurry storage tank 7 through the first slurry conveying pipeline 52. A first slurry storage tank slurry inlet on-off valve 53 is mounted on the first slurry conveying pipeline 52. A first pump body 66 is mounted on the first slurry conveying pipeline between the first slurry storage tank slurry inlet on-off valve 53 and the first mixing plant 50. The first mixing plant 50 can transfer a prepared slurry to the first slurry storage tank 7.

The second mixing plant 51 is connected to an inlet of second slurry storage tank 8 through the second slurry conveying pipeline 54. A second slurry storage tank slurry inlet on-off valve 55 is mounted on the second slurry conveying pipeline 54. A second pump body 67 is mounted on the second slurry conveying pipeline 54 between the second slurry storage tank slurry inlet on-off valve 55 and the second mixing plant 51. The second mixing plant 51 can transfer prepared slurry to the second slurry storage tank 8.

The multi-pump linkage grouting operating system further includes a main water storage tank 56. A third pump body 68 is mounted at an outlet of the main water storage tank 56. An outlet of the third pump body 68 is connected to the first mixing plant 50 through the first mixing plant cleaning pipeline 57. A first mixing plant cleaning on-off valve 58 is mounted on the first mixing plant cleaning pipeline 57. The main water storage tank 56 is further connected to the second mixing plant 51 through the second mixing plant cleaning pipeline 59. A second mixing plant cleaning on-off valve 60 is mounted on the second mixing plant cleaning pipeline 59.

The main water storage tank 56 is connected to the first slurry storage tank 7 through the first slurry storage tank cleaning pipeline 61, and a first slurry storage tank cleaning on-off valve 62 is mounted on the first slurry storage tank 7. The main water storage tank 56 is connected to the second slurry storage tank 8 through the second slurry storage tank cleaning pipeline 63, and a second slurry storage tank cleaning on-off valve 64 is mounted on the second slurry storage tank.

The main water storage tank 56 is further connected to the water tank through a water replenishing pipeline for supplying water to the water tank 22, and a water replenishing on-off valve 65 is mounted on the water replenishing pipeline.

The main water storage tank 56 and the two mixing plants are intended to be disposed at set positions on a construction site.

In the present embodiment, the on-off valves adopt solenoid valves, and the on-off valves are connected to the control system, so that the control system controls the on-off valves to operate.

The operating method for the multi-pump linkage grouting operating system of the present embodiment includes:

turning on a grouting on-off valve on a branch slurry inlet pipe between a grouting pump needing to operate and a slurry storage tank containing a cement slurry and turning off a cleaning on-off valve, to enable the grouting pump to implement single-liquid static pressure grouting;

turning on a grouting on-off valve on a branch slurry inlet pipe between a slurry storage tank containing a first slurry and a corresponding grouting pump for outputting the first slurry, turning on a grouting on-off valve on a branch slurry inlet pipe between a slurry storage tank containing a second slurry and a corresponding grouting pump for outputting the second slurry, turning off the other grouting on-off valves, and turning off cleaning on-off valves, to implement double-liquid grouting through the grouting pumps; and turning on the cleaning on-off valves, to enable the corresponding grouting pumps to operate, so that under the function of the grouting pumps, water in a water tank successively flows through the corresponding cleaning pipes, the branch slurry inlet pipes, the main slurry inlet pipes, and the grouting pumps to implement cleaning of the branch slurry inlet pipes, the main slurry inlet pipes, and grouting pump pipelines.

Specifically:

when a single grouting pump is used for a single-liquid static pressure grouting operation, for example, when the first grouting pump 1 operates and the other grouting pumps do not operate, a slurry is fed to the second slurry storage tank 8, the second grouting on-off valve 11 is turned on, the other on-off valves are all turned off, so that the first grouting pump 1 drives the slurry in the second grouting tank 8 to move, and the first grouting pump 1 carries out the single-liquid static pressure grouting.

It may be understood that, according to actual needs, single-pump single-liquid static pressure grouting can be implemented by turning on a grouting on-off valve on a branch slurry inlet pipe between the grouting pump to operate and the slurry storage tank containing slurry.

When three grouting pumps need to perform single-liquid grouting simultaneously, the slurry is fed to the second slurry storage tank 8, the second grouting on-off valve 11, the fourth grouting on-off valve 16, and the sixth grouting on-off valve 21 are turned on, and the other on-off valves are all turned off, the three grouting pumps carry out single-liquid grouting operation simultaneously.

When a double-liquid grouting operation needs to be performed, double-slurry outputted before mixing is adopted. An admixture is added to the first slurry storage tank 8, a cement slurry is added to the second slurry storage tank 7, the first grouting on-off valve 9, the fourth grouting on-off valve 16, and the sixth grouting on-off valve 21 are turned on, and the other on-off valves are turned off. The first grouting pump 1 outputs the admixture, and the second grouting pump 2 and the third grouting pump 3 output the slurries. The two types of slurries, namely the admixture and cement slurry are outputted before mixing. A proportion of the two slurries are controlled by controlling the operating frequencies of the grouting pumps.

The system of the present embodiment implements a plurality of grouting processes such as single-pipe grouting and multi-pipe grouting through coordination of different on-off valves, and has a strong applicability.

The first pump body 66 and the second pump body 67 operate, so that the slurry prepared by the first mixing plant 50 can be transferred to first slurry storage tank 7 and the slurry prepared by the second mixing plant 51 can be transferred to the second slurry storage tank 8.

When only the branch slurry inlet pipes, the main slurry inlet pipes, and the grouting pump pipelines are cleaned, the corresponding cleaning on-off valves are turned on, the other on-off valves are all turned off, so that the grouting pumps operate, and under the function of the grouting pumps, water in the water tank flows through the branch slurry inlet pipes, the main slurry inlet pipes, and the grouting pumps to clean the branch slurry inlet pipes, the main slurry inlet pipes, and the grouting pump pipelines.

For example, during cleaning of pipelines of the first branch slurry inlet pipe 5, the first main slurry inlet pipe, and the first grouting pump 1, the first cleaning on-off valve 29 is turned on, so that the first grouting pump 1 operates, to drive the water in the water tank 22 to flow through the first cleaning pipe 23, the first branch slurry inlet pipe 5, and the first grouting pump 1, thereby achieving a cleaning function.

When a grouting operation is completed, the devices are withdrawn, and the slurry storage tanks, the main slurry inlet pipes, the branch slurry inlet pipes, and the grouting pump pipelines need to be cleaned, the corresponding slurry storage tank cleaning on-off valves and the grouting on-off valves on the corresponding branch slurry inlet pipes are turned on, and the other on-off valves are turned off.

For example, when two slurry storage tanks and all of the main slurry inlet pipes and branch slurry inlet pipes need to be cleaned, the first slurry storage tank cleaning on-off valve 62 and the second slurry storage tank cleaning on-off valve 64 are turned on, the third pump body 68 is started, the grouting on-off valves on all of the branch slurry inlet pipes are turned on, and all of the other on-off valves are turned off, so that the three grouting pumps operate, and under the function of the grouting pumps, the water in the main water storage tank successively flows through the slurry storage tanks, the branch slurry inlet pipes, the main slurry inlet pipes, and the grouting pumps, thereby achieving a cleaning function.

When the mixing plants, the slurry storage tanks, the main slurry inlet pipes, and the branch slurry inlet pipes need to be cleaned, for example, during cleaning of all of the mixing plants, the slurry storage tanks, the main slurry inlet pipes, and the branch slurry inlet pipes, all of the cleaning on-off valves are turned off, the water replenishing on-off valves are turned off, the water storage tank cleaning on-off valves are turned off, and all the other on-off valves are turned on, to start the third pump body 68, the first pump body 66, and the second pump body 67, so that water in the main water storage tank 56 successively flows through the mixing plants, the slurry storage tanks, the main slurry inlet pipes, the branch slurry inlet pipes, and the grouting pumps, thereby implementing a cleaning function.

By using the system of the present embodiment, the cleaning of the pipelines and the devices can be carried out automatically without manual cleaning, thereby greatly improving the operating efficiency and reducing the labor intensity.

The above descriptions are only preferred embodiments of this application, and are not intended to limit this application. For those skilled in the art, this application may have various modifications and changes. Any modification, equivalent replacement, improvement and the like made without departing from the spirit and principle of this application shall fall within the scope of protection of this application.

The invention claimed is:

1. A multi-pump linkage grouting operating system, comprising a slurry storage unit and a grouting unit, wherein the slurry storage unit comprises a plurality of slurry storage tanks, the grouting unit comprises a plurality of grouting pumps, an inlet of each grouting pump is connected to a main slurry inlet pipe, the main slurry inlet pipe is connected to a plurality of branch slurry inlet pipes, the branch slurry inlet pipes are connected to an outlet of a corresponding slurry storage tank, grouting on-off valves are mounted on the branch slurry inlet pipes, each branch slurry inlet pipe is further connected to one end of a cleaning pipe, a connection position between the cleaning pipe and the branch slurry inlet pipe is located downstream of the grouting on-off valve on the branch slurry inlet pipe, the other end of the cleaning pipe is connected to a water tank, and a cleaning on-off valve is mounted on the cleaning pipe.

2. The multi-pump linkage grouting operating system according to claim 1, wherein a flow detection element is further mounted on the branch slurry inlet pipe to detect a grouting flow, the flow detection element is connected to a control system, and correspondingly the grouting pump is connected to the control system through an inverter.

3. The multi-pump linkage grouting operating system according to claim 1, wherein a stirring apparatus is mounted in the slurry storage tank, to stir slurry inside the slurry storage tank.

4. The multi-pump linkage grouting operating system according to claim 1, further comprising a plurality of mixing plants, wherein an inlet of each slurry storage tank is connected to a corresponding mixing plant through a slurry conveying pipeline, and a slurry storage tank slurry inlet on-off valve is mounted on the slurry conveying pipeline.

5. The multi-pump linkage grouting operating system according to claim 4, further comprising a main water storage tank, wherein the mixing plants are connected to the main water storage tank through mixing plant cleaning pipelines, mixing plant cleaning on-off valves are mounted on the mixing plant cleaning pipelines, the main water storage tank is connected to the slurry storage tanks through slurry storage tank cleaning pipelines, slurry storage tank cleaning on-off valves are mounted on the slurry storage tank cleaning pipelines, a clean water tank is connected to the main water storage tank through a water replenishing pipeline, and a water replenishing on-off valve is disposed on the water replenishing pipeline.

6. The multi-pump linkage grouting operating system according to claim 1, wherein the slurry storage tanks and the water tank are mounted on a first traveling vehicle, the first traveling vehicle is provided with a traction frame, the first traveling vehicle is connected to a second traveling vehicle through the traction frame and a tow hook disposed on the second traveling vehicle, and the plurality of grouting pumps are mounted on the second traveling vehicle.

7. The multi-pump linkage grouting operating system according to claim 6, wherein the first traveling vehicle comprises a first vehicle body, a traveling wheel is mounted at a bottom portion of the first vehicle body, the second traveling vehicle comprises a second vehicle body, a crawler type traveling mechanism is mounted at a bottom portion of the second vehicle body, and the crawler type traveling mechanism is connected to a power mechanism mounted on the second vehicle body.

8. The multi-pump linkage grouting operating system according to claim 6, wherein each of the first traveling vehicle and the second traveling vehicle is provided with a protection cover, the protection cover of the first traveling vehicle is provided with a door, a cover wall of the protection cover of the second traveling vehicle parallel to a traveling direction is provided with an opening, an upper protection plate and a lower protection plate are disposed at the opening, an upper edge of the upper protection plate is rotatably connected to the cover wall of the protection cover, and a lower edge of the lower protection plate is rotatably connected to the cover wall of the protection cover.

9. The multi-pump linkage grouting operating system according to claim 6, wherein a rear end of the first traveling vehicle is provided with a first support mechanism, front and rear ends of the second traveling vehicle are each provided with at least one second support mechanism, the first support mechanism is rotatably connected to the first traveling vehicle, the second support mechanism comprises a telescopic component having an axis that is arranged vertically, and a bottom end of the telescopic component is connected to a support plate.

10. An operating method for a multi-pump linkage grouting operating system according to claim 1, comprising:

turning on a grouting on-off valve on a branch slurry inlet pipe between a grouting pump needing to operate and a slurry storage tank containing a cement slurry and turning off a cleaning on-off valve, to enable the grouting pump to implement single-liquid grouting;

turning on a grouting on-off valve on a branch slurry inlet pipe between a slurry storage tank containing a first slurry and a corresponding grouting pump for outputting the first slurry, turning on a grouting on-off valve on a branch slurry inlet pipe between a slurry storage tank containing a second slurry and a corresponding grouting pump for outputting the second slurry, turning off the other grouting on-off valves, and turning off cleaning on-off valves, to implement double-liquid grouting through the grouting pumps; and turning on the cleaning on-off valves, to enable the grouting pumps corresponding to the cleaning on-off valve to operate, so that under the function of the grouting pumps, water in a water tank successively flows through the corresponding cleaning pipes, the branch slurry inlet pipes, the main slurry inlet pipes, and the grouting pumps to implement cleaning of the branch slurry inlet pipes, the main slurry inlet pipes, and grouting pump pipelines.

* * * * *